United States Patent
Monnerie

(10) Patent No.: US 9,027,618 B2
(45) Date of Patent: *May 12, 2015

(54) MOUNTED ASSEMBLIES FOR AIRCRAFT, WHEELS AND TIRES

(75) Inventor: Christian Monnerie, Clermont-Ferrand (FR)

(73) Assignees: Compagnie Generale des Etablissement Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 1398 days.

This patent is subject to a terminal disclaimer.

(21) Appl. No.: 12/405,873

(22) Filed: Mar. 17, 2009

(65) Prior Publication Data
US 2009/0178749 A1    Jul. 16, 2009

Related U.S. Application Data

(63) Continuation of application No. 11/182,860, filed on Jul. 18, 2005, now abandoned, which is a continuation of application No. PCT/EP2004/000228, filed on Aug. 5, 2004.

(30) Foreign Application Priority Data

Jan. 17, 2003 (FR) .................................. 03 00688
Aug. 14, 2003 (FR) .................................. 03 09974

(51) Int. Cl.
| B60C 15/00 | (2006.01) |
| B60C 15/06 | (2006.01) |
| B60C 9/02 | (2006.01) |
| B60C 15/024 | (2006.01) |
| B60C 15/04 | (2006.01) |

(52) U.S. Cl.
CPC ...... B60C 15/0018 (2013.04); *Y10T 152/10765* (2015.01); *Y10T 152/10819* (2015.01); *Y10T 152/10846* (2015.01); B60C 9/023 (2013.01); B60C 15/024 (2013.01); B60C 15/04 (2013.01); *B60C 2200/02* (2013.04)

(58) Field of Classification Search
None
See application file for complete search history.

(56) References Cited

U.S. PATENT DOCUMENTS

| 2,817,381 | A |   | 12/1957 | Powers |
| 3,867,973 | A | * | 2/1975 | Cozzolino et al. ............ 152/153 |
| 4,029,137 | A |   | 6/1977 | Suydam |
| 4,434,830 | A |   | 3/1984 | Landers et al. |
| 4,811,773 | A |   | 3/1989 | Endo et al. |
| 4,813,467 | A |   | 3/1989 | Hinkel et al. |
| 5,660,656 | A |   | 8/1997 | Herbelleau et al. |

(Continued)

FOREIGN PATENT DOCUMENTS

| FR | 818 536 | 9/1937 |
| FR | 1 175 737 | 4/1959 |

(Continued)

*Primary Examiner* — Justin Fischer
(74) *Attorney, Agent, or Firm* — Dickinson Wright PLLC

(57) ABSTRACT

A mounted assembly of a wheel and a tire. The tire inflation pressure is greater than 9 bar, and a relative deflection of the tire greater than 30%. The rim comprises a drop-center functionality and is of monobloc type. A carcass reinforcement includes a circumferential alignment of carcass reinforcement elements anchored in the beads by a stack of circumferentially oriented reinforcement elements, and by an anchoring rubber mix having an elasticity modulus of less than 30 MPa at 10% deformation.

31 Claims, 9 Drawing Sheets

(56) References Cited

U.S. PATENT DOCUMENTS

| | | | |
|---|---|---|---|
| 5,759,314 A | 6/1998 | Southarewsky | |
| 6,425,429 B1 * | 7/2002 | Arnaud et al. | 152/547 |
| 6,523,591 B1 | 2/2003 | Billieres et al. | |
| 6,997,224 B2 * | 2/2006 | Herbelleau et al. | 152/544 |
| 7,278,457 B2 | 10/2007 | Monnerie | |
| 2003/0150541 A1 | 8/2003 | Herbelleau et al. | |

FOREIGN PATENT DOCUMENTS

| | | |
|---|---|---|
| FR | 2 771 050 A1 | 5/1999 |
| JP | 4-103412 A | 4/1992 |
| JP | 6-143948 A | 5/1994 |
| JP | 8-156533 A | 6/1996 |
| WO | WO 02/00452 A1 | 1/2002 |
| WO | WO 02/10265 A1 | 2/2002 |

* cited by examiner

MOUNTED ASSEMBLIES FOR AIRCRAFT, WHEELS AND TIRES

This application is a continuation of application Ser. No. 11/182,860 filed Jul. 18, 2005, which is a continuation of International Application No. PCT/EP2004/000228 filed on Jan. 15, 2004 and which published under No. WO 2004/065141 on Aug. 5, 2004.

BACKGROUND

The invention relates to mounted assemblies for aircraft and to the wheels and tires which constitute them. The mounted assemblies for aircraft to which the invention relates are characterized in particular by the combination of an inflation pressure greater than 9 bar and a relative deflection of the tire greater than 30%.

The deflection of a tire is defined by the radial deformation of the tire, or variation in the radial height, when it changes from a non-loaded state to a statically loaded state, under rated load and pressure conditions.

It is expressed in the form of a relative deflection, defined by the ratio of this variation in the radial height of the tire to half the difference between the external diameter of the tire and the maximum diameter of the rim measured on the hook. The external diameter of the tire is measured statically in a non-loaded state at the rated pressure.

The reinforcement armature or reinforcement of tires and in particular of aircraft tires is currently—and most frequently—formed by a ply or a stack of several plies conventionally referred to as "carcass plies", "crown plies", etc. This manner of designating the reinforcement armatures derives from the manufacturing process, which consists of producing a series of semi-finished products in the form of plies, provided with cord reinforcing threads which are frequently longitudinal, which are subsequently assembled or stacked in order to build a tire blank. The plies are produced flat, with large dimensions, and are subsequently cut according to the dimensions of a given product. The plies are also assembled, in a first phase, substantially flat. The blank thus produced is then shaped to adopt the toroidal profile typical of tires. The semi-finished products referred to as "finishing" products are then applied to the blank, so as to obtain a product ready to be vulcanized.

Such a type of "conventional" process involves, in particular for the phase of manufacture of the blank of the tire, the use of an anchoring element (generally a bead wire), used for anchoring or holding the carcass reinforcement in the zone of the beads of the tire. Thus, in this type of process, a portion of each of the plies constituting the carcass reinforcement (or only a part thereof) is turned up around a bead wire arranged in the tire bead. In this manner, the carcass reinforcement is anchored in the bead.

The fact that this conventional type of process has become more widespread in the industry, despite numerous variants in the manner of producing the plies and assemblies, has led the person skilled in the art to use a vocabulary modeled on the process; hence the generally accepted terminology, comprising in particular the terms "plies", "carcass", "bead wire", "shaping" to designate the change from a flat profile to a toroidal profile, etc.

There are nowadays tires which do not, properly speaking, comprise "plies" or "bead wires" in accordance with the preceding definitions. For example, document EP 0 582 196 describes tires manufactured without the aid of semi-finished products in the form of plies. For example, the reinforcement elements of the different reinforcement structures are applied directly to the adjacent layers of rubber mixes, the whole being applied in successive layers to a toroidal core the form of which makes it possible to obtain directly a profile similar to the final profile of the tire being manufactured. Thus, in this case, we no longer find "semi-finished products", nor "plies", nor "bead wires". The base products, such as the rubber mixes and the reinforcement elements in the form of cords or filaments, are applied directly to the core. As this core is of toroidal form, the blank no longer has to be shaped in order to change from a flat profile to a profile in the form of a torus.

Furthermore, the tires described in this document do not have the "conventional" upturn of the carcass ply around a bead wire. This type of anchoring is replaced by an arrangement in which circumferential cords are arranged adjacent to said sidewall reinforcement structure, the whole being connected by an anchoring or bonding rubber mix.

There are also processes for assembly on a toroidal core using semi-finished products, such as strips, specially adapted for quick, effective and simple laying on a central core. Finally, it is also possible to use a mixture comprising at the same time certain semi-finished products to produce certain architectural aspects (such as plies, bead wires, etc.), whereas others are produced from the direct application of mixes and/or reinforcement elements.

In the present document, in order to take into account recent technological developments both in the field of manufacture and in the design of products, the conventional terms such as "plies", "bead wires", etc., are advantageously replaced by neutral terms or terms which are independent of the type of process used. Thus, the term "carcass-type reinforcing thread" or "sidewall reinforcing thread" is valid as a designation for the reinforcement elements of a carcass ply in the conventional process, and the corresponding reinforcement elements, generally applied at the level of the sidewalls, of a tire produced in accordance with a process without semi-finished products. The term "anchoring zone", for its part, may equally well designate the "traditional" upturn of a carcass ply around a bead wire of a conventional process and the assembly formed by the circumferential reinforcement elements, the rubber mix and the adjacent sidewall reinforcement portions of a bottom zone produced with a process using application on a toroidal core.

Hereafter, "axial" is understood to mean a direction parallel to the axis of rotation of the tire; this direction may be "axially inner" when it is directed towards the inside of the tire and "axially outer" when it is directed towards the outside of the tire.

"Radial" is understood to mean a direction perpendicular to the axis of rotation of the tire and passing through this axis of rotation. This direction may be "radially inner" or "radially outer" depending on whether it is directed towards the axis of rotation or towards the outside of the tire.

"A radially oriented reinforcement element" is understood to mean a reinforcement element contained substantially within one and the same axial plane.

"A circumferentially oriented reinforcement element" is understood to mean a reinforcement element oriented substantially parallel to the circumferential direction of the tire, that is to say forming with this direction an angle which does not diverge by more than five degrees from the circumferential direction.

"Reinforcement element" is understood to mean equally well monofilaments and multifilaments, or assemblies such as cables, plied yarns or alternatively any equivalent type of assembly, whatever the material and the treatment of these reinforcement elements, for example surface treatment or coating or pre-sizing in order to promote adhesion to the rubber.

"Contact" between a reinforcement element and an anchoring rubber mix is understood to mean the fact that at least part of the outer circumference of the reinforcement element is in intimate contact with the anchoring rubber mix; if a reinforcement element comprises a covering or a coating, the term "contact" means that it is the outer circumference of this covering or coating which is in intimate contact with the anchoring rubber mix "Elasticity modulus" of a rubber mix is understood to mean a secant modulus of extension at 10% deformation and at ambient temperature; the measurement is effected after a first accommodation cycle up to 10% deformation:

$$-E_{10} = \frac{F_{10}}{S \times \varepsilon_{10}} \text{ i.e.}$$

$$E_{10} = \frac{F_{10}(1+\varepsilon_{10})}{S_0 \times \varepsilon_{10}} \text{ and}$$

$$E_{10} = \frac{F_{10} \times 1.1}{S_0 \times 0.1}$$

in which $\varepsilon_{10}$ is equal to 0.1; with $E_{10}$: secant modulus of extension at 10% deformation; $F_{10}$: tensional force at 10% extension; $S_0$: initial section of the test piece; S: section of the test piece at the deformation of extension $\varepsilon$; in the case of rubber material, it is known that:

$$S = \frac{S_0}{1+\varepsilon};$$

and $\varepsilon_{10}$: deformation of extension at 10%. The measurements of elasticity modulus of a rubber mix are carried out under tension in accordance with Standard AFNOR-NFT-46002 of September 1988: the nominal secant modulus (or apparent stress, in MPa) at 10% elongation is measured in a second elongation (i.e. after an accommodation cycle) (normal conditions of temperature and relative humidity in accordance with Standard AFNOR-NFT-40101 of December 1979).

"Tg" of an elastomer is understood to mean the glass transition temperature thereof measured by differential thermal analysis.

"Static creep test" is understood to mean a test in which test pieces are prepared, the useful part of which has a length of 70 mm, a width of 5 mm and a thickness of 2.5 mm (these test pieces are cut from vulcanized sheets of a thickness of 2.5 mm); the test pieces are placed in an oven at 150° C. and a 3 kg weight is immediately hung from them; the test is thus carried out with an initial stress of:

$$\sigma_0 = \frac{Mg}{S_0} = 2.35 \text{ MPa}$$

with M: weight applied, g: gravity acceleration and $S_0$: initial section of the test piece being measured; the elongation of the useful part of the test piece is measured as a function of time; the "amount of static creep" corresponds to the variation of deformation over a given time, for example between 3 and 5 hours' testing:

$$\tau = \frac{\Delta \varepsilon}{\Delta t}$$

where: $\Delta \varepsilon = \varepsilon(t_2) - \varepsilon(t_1)$ variation in the deformation measured during $\Delta t = t_2 - t_1$ in minutes (min).

"Rheometry test" is understood to mean an alternating shearing test at a deformation of ±0.2 degrees, a frequency of 100 cycles/min, a temperature of 197° C. and a duration of 10 min; rheometer from Monsanto; the test is performed on a disc of uncured mix, the change over the 10 min. in the torque resulting from the shearing imposed between the two faces of the disc is recorded; the change in the torque after the maximum measured will be particularly noted here: if the torque measured remains stable, there is no reversion, that is to say, reduction in the stiffness of the test piece; if the torque measured decreases, it indicates that there is reversion; the phenomenon of reversion results in a reduction in the rigidity of the test piece under the test conditions; it is a test of the thermal stability of the mix at high temperature;

$$r = \frac{C_{max} - C_{10}}{C_{max}} \times 100$$

is the amount of reversion at the end of the test; $C_{max}$ is the maximum torque measured and $C_{10}$ is the torque measured after 10 minutes' testing.

As far as the cords or metal cables are concerned, the measurements of breaking load (maximum load in N), tensile strength (in MPa) and elongation at break (total elongation in %) are carried out under tension in accordance with Standard ISO 6892 of 1984.

As far as the cords or textile cables are concerned, the mechanical properties are measured on fibers which have been subjected to prior conditioning. "Prior conditioning" is understood to mean storage of the fibers for at least 24 hours, before measurement, in a standard atmosphere in accordance with European Standard DIN EN 20139 (temperature of 20±2° C.; relative humidity of 65±2%). The mechanical properties in extension (tenacity, modulus, elongation and energy at break) are measured in known manner using a ZWICK GmbH & Co (Germany) 1435-type or 1445-type tension machine. The fibers, after receiving a slight prior protective twist (helix angle of approximately 6°), are subjected to traction over an initial length of 400 mm at a nominal speed of 200 mm/min. All the results are an average of 10 measurements.

The tires may, as previously mentioned, have different types of construction.

U.S. Pat. No. 4,832,102 for example describes an aircraft tire comprising a crown, two sidewalls and two beads, a carcass reinforcement and a crown reinforcement in which the carcass reinforcement comprises two circumferential alignments of reinforcing threads of high elasticity modulus, anchored in the two beads, and the crown reinforcement comprises at least one working block with at least one ply of reinforcing threads of high elasticity modulus. The carcass reinforcement is anchored in the beads by turning up, around a bead wire, the two circumferential alignments of first reinforcing threads of high elasticity modulus.

Patent WO 02/00456 describes a different type of aircraft tires the carcass reinforcement of which comprises two or three circumferential alignments of reinforcement elements of high elasticity modulus and anchoring means of said reinforcement elements, constituting the carcass reinforcement, within each bead. The anchoring means in accordance with this document are formed of circumferentially oriented cords axially bordering the circumferential alignments of the reinforcement elements of the carcass reinforcement, said reinforcement elements of the carcass reinforcement and the circumferentially oriented cords being separated by a bonding rubber mix of very high elasticity modulus. The use of cords makes it possible to obtain satisfactory rigidity with a bulk of the bead which is reduced as much as possible; the compactness of the bead is of paramount importance for aircraft tires to reduce the consequences of heating of said beads.

Aircraft tires must withstand extreme conditions during service, in particular in terms of applied load and speed, taking into account their low weight and size. As a result, despite their very high inflation pressures, greater than 9 bar, their loading or deflection during operation may commonly reach values double those observed for heavy-vehicle tires or passenger-car tires.

During takeoff, very high speeds, of the order of 350 km/hour or even 450 km/hour, are achieved, and hence the heating conditions are also very harsh.

All these conditions are particularly disadvantageous for the endurance of the beads of these tires.

These conditions are also restricting with regard to the holding of the tires on the rim. They have hitherto resulted in tires comprising an extremely rigid bottom zone or bead zone which permits good holding on said rim. This rigidity of the bottom zone of the tire consequently necessitates rims made in several parts which permit mounting and demounting of the aircraft tires.

Furthermore, the mounted assemblies thus produced for aircraft require strict, rigorous and frequent examination. These inspections may be accompanied by demounting of the mounted assembly and dissociation of the wheel and of the tire. These technical operations are longwinded and require action by a highly-qualified workforce.

The particular aim of the invention is a mounted assembly or tire-wheel assembly for aircraft which facilitates these technical inspections and more particularly which facilitates demounting and remounting of the mounted assemblies during the life of an aircraft tire.

SUMMARY OF THE INVENTION

This object has been achieved according to one aspect of the invention by a mounted assembly for aircraft formed of a wheel and a tire comprising in particular beads, the inflation pressure of which is greater than 9 bar and the relative deflection of which is greater than 30%, said wheel comprising a rim for receiving the tire and more specifically seats receiving the beads of said tire, said rim comprising a drop-centre functionality.

According to one preferred embodiment of the invention, the rim is of monobloc type.

A drop-centre functionality is to be understood to mean that the wheel comprises a structure which imparts a functionality comparable to that of a drop centre of a conventional monobloc rim for applications other than those of aircraft; the function of a drop centre is in particular to permit mounting of a tire in combination with a certain deformation of the beads thereof. This mounting method is entirely conventional in applications other than those of aircraft. In these other applications, it is conventional, for mounting a tire on a monobloc wheel, to provide, in the part located between the seats of the wheel, an indented zone or drop centre which makes it possible to receive in succession part of each of the beads of the tire in order to mount it.

The beads of the tire of the mounted assembly according to the invention are advantageously ovalisable, that is to say deformable in their plane, preferably under industrially acceptable forces.

More preferably still, the beads of the tire of the mounted assembly according to the invention may be warped, that is to say their perimeter is deformable in the axial direction.

The Applicant noted that it was possible, by influencing certain criteria, also to produce mounted assemblies for aircraft the tires of which lend themselves to being mounted on a rim comprising a drop-centre functionality.

There was thus unexpectedly obtained a mounted assembly for aircraft consisting of a tire and a wheel and more specifically of a rim comprising a drop-centre functionality advantageously of monobloc type, without sacrificing in particular the endurance of the tire and the clamping of said tire on the rim. This realization is in particular surprising if it is recalled that the technology of mounting tires on monobloc rims, which has been conventional in all categories of land vehicles for many years, has never applied to the field of aircraft, despite the considerable expansion of this mode of transport.

The mounting and demounting of the mounted assemblies according to the invention can thus be effected more simply and more quickly than for a wheel consisting of several parts, because the tools and the skills required for these operations are simpler than in the mounting and demounting operations conventionally practiced. This of course has economic advantages of different orders as far as the direct means of implementing and the workforce and its necessary training are concerned.

Furthermore, the possibility of mounting an aircraft tire on a wheel of monobloc type may make it possible to constitute a mounted assembly according to the invention the weight of which is substantially less than the weight of a conventional mounted assembly the wheel of which is formed of several parts. This may also result in substantial economic advantages, as the saving in weight of the mounted assembly may result in an increase in the transportable weight or in a reduction in the fuel consumption of the aeroplane.

The conventional process for mounting a tubeless tire on a monobloc rim comprising a drop centre for applications other than aircraft applications consists of different stages which are as follows: first of all, part of the first bead is passed over the rim flange and this part is placed in the drop centre. The rest of the bead can then be passed over the flange by slightly ovalising the corresponding bead of the tire. The same applies for passing the second bead over the flange of the rim. The mounting is then terminated by a final stage of inflation to a pressure such that it ensures that the beads are put in place on the seats bearing on the rim flanges. During this last stage, the beads may cross humps which form an obstacle to the passage of said beads as far as their respective seat and then prevent the risks of unseating.

The invention provides for this drop-centre functionality to be able to be fulfilled for example by a limited indented zone on the periphery of the wheel or alternatively by one or more limited openings on the periphery of the wheel. In this latter case of embodiment, the invention advantageously provides for the braking system to be integrated in the wheel, coming to block said opening(s). This blocking of the opening(s) may make it possible to function as an anti-unseating device, because the blocking of the opening(s) eliminates the drop-centre functionality necessary for demounting of the tire or for the unseating thereof. Such a system may therefore possibly make it not necessary to have humps.

In the same manner, the invention provides for the openings providing the drop-centre functionality possibly to be blocked by any means known to the person skilled in the art once they have fulfilled their function during mounting of the tire.

The invention also provides for the means providing the drop-centre functionality to possibly constitute part of the braking device which is integrated inside the wheel.

According to one advantageous embodiment of the invention, the seats of the rim of the wheel of the mounted assembly have a slope of 5°.

According to another embodiment of the invention, the seats of the rim of the wheel of the mounted assembly have a slope greater than 5° and preferably less than 15°.

According to the latter embodiments of the invention, according to which the seats of the rim have a slope, the endurance of the beads of the tire can be improved.

A first variant embodiment of the invention advantageously provides that, the tire comprising a crown, two sidewalls and two beads, a carcass reinforcement anchored in the two beads and a crown reinforcement, in which the carcass reinforcement comprises at least one circumferential alignment of reinforcement elements and in which the anchoring means of said reinforcement elements within each bead comprise at least one circumferentially oriented reinforcement element, the carcass reinforcement of the tire comprises at least one layer of reinforcement elements having a zone of upturn around at least one circumferentially oriented reinforcement element.

According to this first variant embodiment of the invention, the mounted assembly comprises an aircraft tire in which the carcass reinforcement is anchored in the beads by turning up around at least one circumferentially oriented reinforcement element, such as a bead wire.

A second variant embodiment of the invention advantageously provides that, the tire comprising a crown, two sidewalls and two beads, a carcass reinforcement anchored in the two beads and a crown reinforcement, in which the carcass reinforcement comprises at least one circumferential alignment of reinforcement elements and in which the anchoring means of said reinforcement elements within each bead comprise at least one circumferentially oriented reinforcement element, the means for anchoring said reinforcement elements within each bead of the tire comprise circumferentially oriented reinforcement elements axially bordering said circumferential alignments of said reinforcement elements of the carcass reinforcement.

The invention also proposes an aircraft wheel comprising a rim for receiving a tire, comprising in particular beads, and more specifically seats receiving the beads of said tire, the inflation pressure of the mounted assembly formed of the wheel and said tire being greater than 9 bar and the relative deflection of which is greater than 30%, said rim comprising a drop-centre functionality.

Preferably, the rim of the wheel according to the invention is of monobloc type.

As previously mentioned, according to a first embodiment of the invention, the seats of the rim of the wheel have a slope of 5°.

According to another embodiment of the invention, the seats of the rim of the wheel have a slope greater than 5° and preferably less than 15°.

The invention also proposes an aircraft tire, the inflation pressure of which is greater than 9 bar and the relative deflection of which is greater than 30%, comprising a crown, two sidewalls and two beads, a carcass reinforcement anchored in the two beads and a crown reinforcement, in which the carcass reinforcement comprises at least one, and preferably at least two, circumferential alignments of reinforcement elements and in which the means for anchoring said reinforcement elements within each bead comprise at least one circumferentially oriented reinforcement element, the beads of the tire being ovalisable, that is to say deformable in their plane, preferably under industrially acceptable forces.

More preferably still, the beads of the tire may be warped, that is to say the perimeter of which is deformable in the axial direction.

The invention proposes another aircraft tire, the inflation pressure of which is greater than 9 bar and the relative deflection of which is greater than 30%, comprising a crown, two sidewalls and two beads, a carcass reinforcement anchored in the two beads and a crown reinforcement, in which the carcass reinforcement comprises at least one, and preferably at least two, circumferential alignments of reinforcement elements and in which the means for anchoring said reinforcement elements within each bead comprise at least one circumferentially oriented reinforcement element, and at least one anchoring rubber mix in contact with the circumferential reinforcing thread and the reinforcement elements of the carcass reinforcement, the rubber mix having an elasticity modulus, at a deformation of 10%, of less than 20 MPa.

The tire thus defined according to the invention has beads, the rigidity of which, which is less than that of conventionally-manufactured aircraft tires, makes it possible to facilitate the mounting and demounting of said aircraft tire. Surprisingly, the Applicant has noted that this anchoring rubber mix made it possible, in spite of its rigidity, which is very much less than what was advocated previously, to retain very satisfactory properties, in particular endurance properties, of the beads in question.

According to a preferred variant embodiment, the anchoring rubber mix comprises at least one synthetic elastomer included in the group of "SBRs", or butadiene/styrene copolymers, and "BRs", or polybutadienes, with a total proportion of synthetic elastomer greater than 50% of the total weight of elastomers.

Preferably, the total proportion of synthetic elastomer is of between 55 and 65% of the total weight of elastomers.

Above 65%, the tack of the connecting rubbers becomes insufficient and this causes problems in building the beads of the tires; on the other hand, below 55%, the resistance of the anchoring rubber mixes to static creep stress at high temperature deteriorates.

The anchoring rubber mix preferably comprises an SBR of a Tg of between −70° and −25° C. with a proportion by weight greater than 20% of the total weight of elastomers.

It may also comprise a BR of a Tg of between −110° and −90° C. with a proportion by weight of less than 40% of the total weight of elastomers.

In fact, the presence of BR improves the thermal stability of the anchoring rubber mix at high temperature; however, beyond 40% of the total weight of elastomers, the anchoring rubber mix becomes difficult to produce.

According to one advantageous embodiment, the anchoring rubber mix withstands without breaking a static creep stress at 150° C. under an initial stress of 2.35 MPa for at least 5 hours.

Preferably, the anchoring rubber mix has an amount of static creep at 150° C. under an initial stress of 2.35 MPa of less than $2 \times 10^{-3}$/min for between 3 and 5 hours' applied stress.

Preferably, said anchoring rubber mix has an amount of reversion after 10 min at 197° C. of less than 10% and preferably less than 5%.

According to a first embodiment of the invention, this applies to an aircraft tire in which the carcass reinforcement of the tire comprises at least one layer of reinforcement elements having a zone of upturn around at least one circumferentially oriented reinforcement element, such as a bead wire.

According to this first embodiment, it appeared that the rubber mix according to the invention makes it possible to impart, as described previously, a certain flexibility to the bead which facilitates the mounting and demounting of the tire.

More advantageously still, according to this first embodiment, when the carcass reinforcement is turned up around a bead wire, the rubber mix is advantageously present, apart from the zone between the bead wire and the carcass reinforcement, within the bead wire, between the different reinforcement elements constituting it. For certain types of tire, provision may advantageously also be made to subdivide the bead wire(s) to increase the proportion of rubber mix according to the invention relative to the proportion of reinforcement element in a given zone. This may result in the presence of numerous subdivisions of bead wires, whether arranged in organized manner or not. The bead wire(s) may be formed of cords or cables selected from the group of carbon, tungsten, aramid, glass-fiber or steel reinforcing threads.

According to a second embodiment of the invention, the invention applies to an aircraft tire in which the carcass reinforcement is anchored in the beads by means of circumferentially oriented reinforcement elements axially bordering said reinforcement elements of the carcass reinforcement.

According to this second embodiment, in which the anchoring of the carcass reinforcement and the circumferential reinforcement elements is obtained by an anchoring rubber mix, it appeared that said rubber mix according to the invention provides sufficient flexibility to improve the conditions of mounting and demounting aircraft tires on/from their wheels.

In accordance with this second embodiment, the invention advantageously provides for the circumferential reinforcement elements to be cables.

Preferably, said cables have a penetrability of between 80 and 100%, the breaking load of said cables being greater than 150 daN and said cables having an elongation at break greater than 4%.

Using cables makes it possible to improve and facilitate the manufacture of the tires according to the invention using manufacturing technologies of the type on a toroidal core. The Applicant has observed that the fact of replacing, in the tire according to the invention, anchoring of the carcass reinforcement by means of circumferential cords coupled with the reinforcement elements of the carcass reinforcement by means of an anchoring rubber mix with anchoring by means of cables as defined previously makes it possible to improve the yield of the manufacturing process. Furthermore, it would appear that the use of the cables defined according to the invention makes it possible to retain compactness of the beads of the tire for satisfactory rigidity for the applications in question.

In fact, it would appear that selecting cables having a penetrability such as described permits hooking in the uncured state of the cables in the zone of the bead satisfactorily without any risk of having said cables become detached, even partially, during the stages of manufacture of the later tire which are carried out before curing said tire.

Furthermore, using cables as circumferential reinforcement elements in accordance with this second embodiment of the invention makes it possible to warp the beads of the tire or to deform the perimeter in the axial direction. Such deformation promotes the mounting and demounting of an aircraft tire according to the invention still further. Such deformation furthermore makes it possible, under very simple conditions, to mount and demount tires on/from monobloc rims, that is to say in a single part.

Using a bead wire, in accordance with the first embodiment of the invention, formed of cords or cables, associated with a rubber mix according to the invention present in the zone between the bead wire and the carcass reinforcement and/or within the bead wire, between the different reinforcement elements which constitute it, also permits mounting and demounting of tires on/from monobloc rims. Such operations however necessitate greater forces than in the case previously mentioned in accordance with the second embodiment of the invention.

The penetrability according to the invention is the ability of the rubber to penetrate the free zones of a cable, that is to say the zones which do not comprise material; it is expressed as a percentage of said free zones occupied by rubber after curing and determined by an air permeability test.

This air permeability test makes it possible to measure a relative index of air permeability. It is a simple way of indirectly measuring the degree of penetration of the cable by a rubber composition. It is performed on cables extracted directly, by decortication, from the vulcanized rubber plies which they reinforce, and which therefore have been penetrated by the cured rubber.

The test is carried out on a given length of cable (for example 2 cm) as follows: air is sent to the entry of the cable, at a given pressure (for example 1 bar), and the quantity of air at the exit is measured, using a flow meter; during the measurement, the sample of cable is locked in a seal such that only the quantity of air passing through the cable from one end to the other, along its longitudinal axis, is taken into account by the measurement. The flow rate measured is lower, the higher the amount of penetration of the cable by the rubber.

The values of elongation at break according to the invention permit optimization of the effectiveness of working of the cables, because in the techniques of manufacture on a toroidal core, the cables are wound circumferentially to form several radially concentric or helicoidal turns permitting better anchoring between the cables and the reinforcement elements of the carcass reinforcement. The values of elongation at break of the cables according to the invention permit deformation of said cables which results in a greater effectiveness yield of said turns. In other words, the deformation of said cables according to the invention makes it possible to obtain a more homogeneous distribution, according to the winding length, of the stresses withstood by one and the same winding of such a cable which does not have said elongation characteristics.

Consequently, the combination of the elongation at break of the cables and their breaking load according to the invention makes it possible to retain a compactness of the bead which is satisfactory for the intended applications.

According to a preferred embodiment of the invention, the breaking load of the cables is less than 400 daN. A breaking load greater than such a value may result, in particular in the case of an overall value of breaking load of the fixed bead and of an imposed cable diameter, in a reduction in the number of turns of said cables and hence in a reduction in the anchoring height between the reinforcement elements of the carcass structure and the circumferentially oriented cables. Such a reduction in the anchoring height may be detrimental to the quality of said anchoring. Furthermore, if the increase in the breaking load of the cables is combined with an increase in the diameter of said cables, this may create problems of bulking in particular in terms of widening the bottom zone.

More preferably still, the elongation at break of the cables is less than 8%. A greater elongation might result in tires having a rigidity of the beads, for high pressures, which is not sufficient to guarantee the holding of said tire on a rim and to guarantee the transmission of the braking torques.

The values of elongation at break of the cables according to the invention are advantageously obtained by heat treatments of the cables which are referred to as "high-elongation" treatments. Such treatments known to the person skilled in the art are described for example in European Patent EP 0 751 015.

According to one advantageous embodiment of the invention, the cables according to the invention comprise a conventional adherent coating such as a brass coating so as to improve the adhesion between said cables and the rubber mixes.

The circumferentially oriented cables preferably have a modulus of extension greater than that of the reinforcement elements of the carcass reinforcement. They are preferably selected from the group consisting of carbon, tungsten, aramid, glass-fiber or steel reinforcing threads.

According to another characteristic of the tire according to the invention, considering $\Sigma R_I$ as being the total of the rigidities of extension of the circumferentially oriented cables arranged axially internally relative to the carcass reinforcement, and considering $\Sigma R_E$ as being the total of the rigidities of extension of the circumferentially oriented cables arranged axially on either side of the carcass reinforcement, then:

$$0.6 \leq \frac{\sum R_I}{\sum R_E} \leq 1.5$$

and preferably:

$$0.7 \leq \frac{\sum R_I}{\sum R_E} \leq 1.3$$

Keeping within these limits for the ratio between the total rigidity of extension of the circumferentially oriented cables arranged inside the carcass reinforcement in each bead and the total rigidity of extension of the circumferentially oriented cables arranged to the outside of the carcass reinforcement has the advantage of making the stress applied on the cables oriented circumferentially in the bead more homogeneous, whatever their position.

According to a preferred embodiment of the invention, the outer surface of the bead of the tire according to the invention comprising a seat followed by a frustoconical wall of substantially radial orientation adjacent radially internally to a wall of cross-section substantially in the form of an arc of a circle and of centre C arranged externally relative to the bead, these walls being intended to bear against the hook and the flange of a suitable rim, considering a line CD, passing through the bead of the tire, forming an angle $\alpha = +45 \pm 5$ degrees relative to the axis A of the tire, all of the circumferentially oriented cables are arranged at a radial distance from the axis of the tire less than or equal to this line CD. This line CD defines substantially an embedding zone which is very rigid, in which the deformations are very much reduced, and a zone of flexure radially above CD. The fact that all the circumferentially oriented cables are in the embedding zone reinforces the endurance of the bead.

Preferably, the bead of the tire according to the invention having an outer surface intended to come into contact with the corresponding surface of the seat and of the hook of the rim, after mounting on said rim and inflation of the tire, the contact zone between the outer surface of the bead and the rim extends at least as far as point B of the hook of maximum radius $R_J$.

Advantageously, $\Phi$ being the diameter of the circumference of the outer surface of the bead intended to come to bear against the circumference of the hook of the rim of maximum radius $R_J$, then:

$$\Phi = 2(R_J - \epsilon)$$

with $\epsilon$ being between 0.5 and 2 mm.

This enables the bead to be "seated" properly on the seat and the hook of the rim and has the advantage of limiting the curvature of the circumferential alignments of the carcass reinforcement during travel, particularly in the contact area.

According to the invention, the reinforcement elements constituting the carcass reinforcement may be any type of reinforcement elements in cord form, capable of reinforcing a given matrix, for example a rubber matrix. As reinforcement elements, mention will be made, for example, of multifilament yarns, these yarns possibly being twisted on themselves or not, of unit threads such as cylindrical or oblong single cords, with or without a twist on themselves, cabled yarns or plied yarns ("cords") obtained by cabling or plying operations on these unit threads or these yarns, such reinforcement elements possibly being hybrid ones, that is to say, composite ones, comprising elements of different natures.

"Plied yarn" (or "folded yarn") is understood to mean a reinforcement element formed of two single yarns or more assembled together by plying operations; these single yarns, which are generally formed of multifilament yarns, are first of all plied individually in one direction (S or Z direction of twist) during a first plying stage, then twisted together in the opposite direction (Z or S direction of twist, respectively) during a second plying stage.

According to one advantageous embodiment of the invention, the reinforcement elements constituting the carcass reinforcement are, for example, made of aromatic polyamide or reinforcement elements such as those described in patent application WO 02/085646. These may be cords or cables.

More advantageously still, the carcass reinforcement of the tires according to the invention comprises two or three circumferential alignments of reinforcement elements for example.

Advantageously, more specifically as far as the tires produced on a hard core are concerned, each circumferential alignment of the carcass reinforcement, within each bead, is bordered axially internally and axially externally by circumferentially oriented cables.

According to one advantageous embodiment, relating even more specifically to tires produced on a hard core, the reinforcement elements of the carcass reinforcement form forward and return paths arranged adjacently, with, at the level of each bead, loops connecting one forward path to one return path each time.

In variant embodiments of the invention, the crown reinforcement of the aircraft tire according to the invention preferably comprises at least one working block with one or more layers of reinforcement elements which are parallel to in each layer, oriented substantially circumferentially; these are advantageously reinforcement elements made of aromatic polyamide, or reinforcement elements such as those described in patent application WO 02/085646.

If necessary, the crown reinforcement comprising a central zone and two lateral zones, the working block furthermore comprises at least two layers of reinforcement elements, oriented substantially circumferentially, arranged axially on either side of the median plane of the tire in the lateral zones of said crown. These layers make it possible to withstand the forces due to centrifugation at high speed. They are preferably arranged radially internally relative to the two layers of circumferentially oriented reinforcement elements of the working block. These two reinforcement layers have the advantage of increasing the wrapping of the lateral zones of the crown without increasing the thickness thereof.

The crown reinforcement may further comprise at least two layers of reinforcement elements, which are parallel to each other in each layer and crossed from one layer to the next, forming an angle α, of between 5° and 35° with the circumferential direction for reinforcing the drift rigidity of the tire. The reinforcement elements are for example reinforcement elements such as those described in patent application WO 02/085646.

The crown reinforcement may also comprise, arranged radially externally relative to the working block, a protective crown layer. This protective layer preferably extends axially beyond the axial width of the layers of reinforcement elements of circumferential orientation.

As mentioned above, the aircraft tire according to the invention is particularly advantageous in constituting a mounted assembly with a wheel of monobloc type, because the possible deformation of the beads of the tire makes it possible in particular to mount and demount the tire on/from such a wheel. Furthermore, these mounting and demounting operations can be effected more simply and more quickly than for a wheel consisting of several parts. This has economic advantages of different orders in particular as far as the direct means of implementing and the workforce and its necessary training are concerned, as stated previously.

The invention thus proposes a use of a tire such as has been described above in a mounted assembly for aircraft as described previously, the rim of which is of monobloc type comprising a drop-centre functionality.

The invention also proposes a use of a tire in a mounted assembly for aircraft as described previously, the wheel of which is of monobloc type comprising a drop-centre functionality, said tire comprising at least any one of the characteristics of the tire according to the invention as described previously.

The invention also proposes a use of a tire such as has just been described in a mounted assembly for aircraft, the inflation pressure of which is greater than 9 bar and the relative deflection of which is greater than 30%, consisting of a wheel and the tire, said wheel comprising a rim for receiving the tire and more specifically seats receiving the beads of said tire, said rim being of the type consisting of several parts.

The invention also proposes a use of a tire in a mounted assembly for aircraft, the inflation pressure of which is greater than 9 bar and the relative deflection of which is greater than 30%, consisting of a wheel and the tire, said wheel comprising a rim for receiving the tire and more specifically seats receiving the beads of said tire, said rim being of the type consisting of several parts, said tire comprising at least any one of the characteristics of the tire according to the invention as described previously.

The invention also proposes a mounted assembly for aircraft, the inflation pressure of which is greater than 9 bar and the relative deflection of which is greater than 30%, consisting of a wheel and a tire as described previously, comprising in particular beads, said wheel comprising a rim for receiving the tire and more specifically seats receiving the beads of said tire, said rim being of the type consisting of several parts.

The tire according to the invention also has advantages with regard to the mounting and demounting of the mounted assembly in the case of a wheel consisting of several parts, because the flexibility of the beads of the aircraft tire according to the invention will make it possible to facilitate the placement of the tire during mounting by reducing the risks of degradation thereof.

Furthermore, the tire according to the invention makes it possible to facilitate the operations of demounting such mounted assemblies. The extreme conditions of use of these mounted assemblies result in a very strong connection between the tire and the rim, which means that it is necessary to exert great forces on said tire; these must be exerted very homogeneously on the periphery of the sidewall of the tire when the latter has rigid beads at the risk of blocking the mounted assembly as soon as the bead becomes positioned at an angle relative to the rim of the wheel. In the case of the invention, this operation is simplified owing to the flexibility of the beads of the tire. The tools and the qualifications of the workforce can thus be less specialized in the case of the invention.

BRIEF DESCRIPTION OF THE DRAWINGS

Other advantageous details and characteristics of the invention will become apparent hereafter from the description of examples of embodiment of the invention with reference to FIGS. 1 to 7, which represent:

FIGS. 1 to 7 are not shown to scale in order to simplify understanding thereof.

DETAILED DESCRIPTION OF PREFERRED EMBODIMENTS

Figure 1:
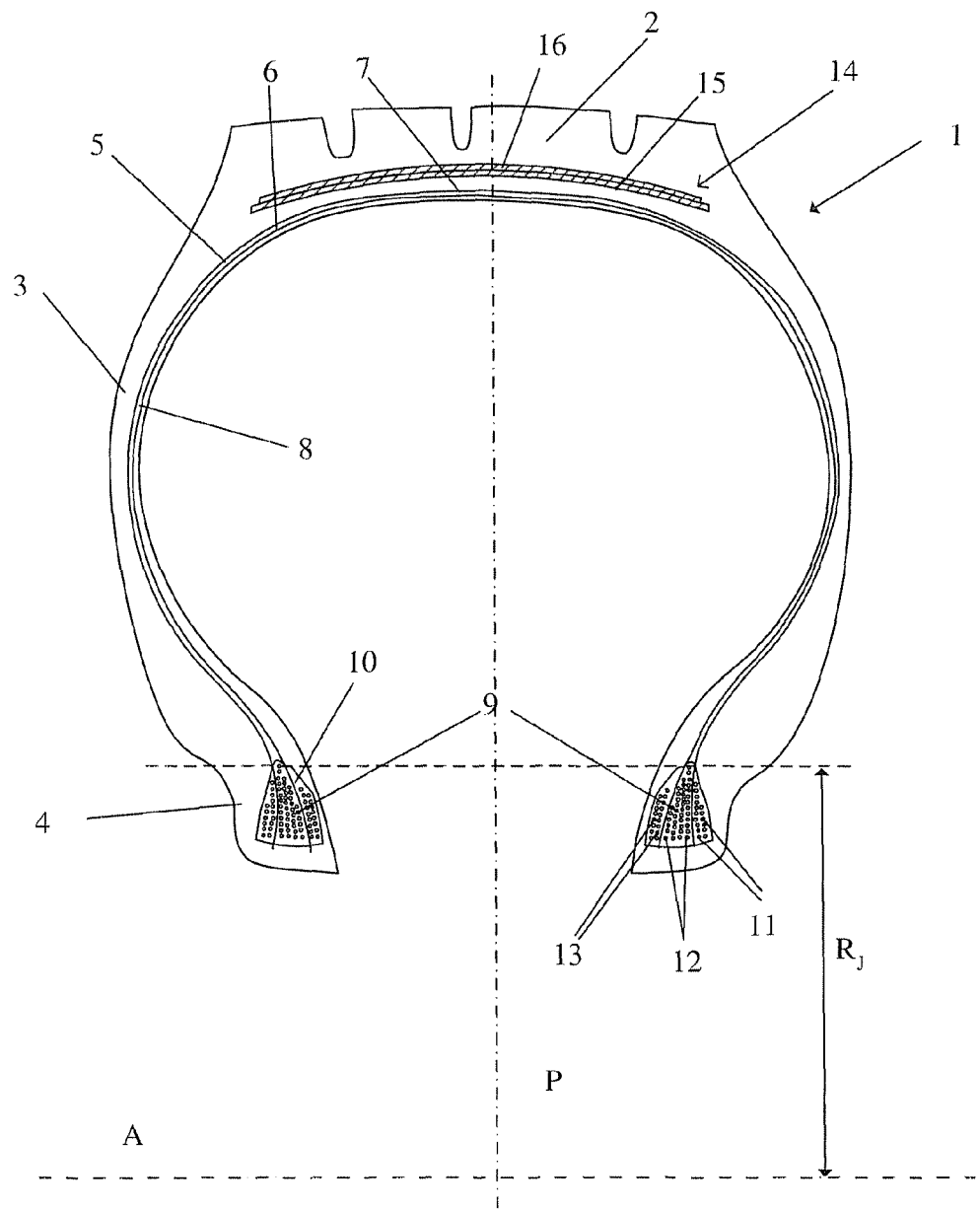
FIG. 1, a diagram of an axial section through a tire according to the invention, FIG. 2, a diagram of a section through a cable according to the invention, FIG. 3, a perspective view showing the arrangement of part of the reinforcing threads of the carcass reinforcement, FIG. 4, a diagram of a bead according to a second embodiment of the invention, FIG. 5, a diagram of an axial section through a tire according to a variant embodiment of the invention shown in FIG. 1, FIG. 6, a diagram of an axial section through a tire according to another variant embodiment of the invention shown in FIG. 1, FIGS. 7a, 7b, 7c, the stages of mounting a tire on a rim to form a mounted assembly according to the invention.

The aircraft tire 1 shown diagrammatically in axial half-section in FIG. 1 comprises a crown 2, two sidewalls 3 and two beads 4. A carcass reinforcement 5 extends from one bead 4 to the other and is formed of two circumferential alignments 6 and 7 of reinforcement elements. The circumferential alignments of the reinforcement elements 6 and 7 are oriented radially in the sidewalls 3 and are formed of reinforcement elements of aromatic polyamide or aramid. The reinforcement elements are arranged parallel to one another and are separated by a layer of mix 8 the nature and the modulus of which are adapted according to their position in the tire.

Anchoring of the two circumferential alignments 6 and 7 is effected in the beads 3 by alignments or "stacks" 9 of circumferentially oriented wound cables arranged axially on either side of each circumferential alignment of the reinforcement elements 6 and 7. Each alignment or stack 9 of circumferentially oriented cables may be obtained by helical winding of a cable. The radial reinforcement elements of the carcass reinforcement and the circumferentially oriented cables are separated from each other by a bonding or anchoring rubber mix 10 in order to avoid any direct contact of one reinforcement element with another. This anchoring rubber mix according to the invention has a rigidity such that its modulus of extension at 10% deformation is of between 10 and 20 MPa. The anchoring rubber mix according to the invention has as other mechanical properties excellent creep resistance at high temperature and very good stability at high temperature. The rigidity selected imparts to the bead structures described sufficient flexibility to make it possible to effect easily the mounting and demounting of the tires without adversely affecting the endurance performance; the creep resistance is essential to obtain solid and durable anchoring of the carcass reinforcements in the beads and the thermal stability at high temperature is also important owing to the very harsh thermal conditions to which the tires may be subjected during operation.

The tension which develops in the radial reinforcement elements upon inflation of the tire 1 is taken up in particular by the lateral adhesion between each circumferential alignment 6 and 7 and the stacks 9 of circumferentially oriented cables. This bead structure ensures excellent anchoring, which remains very effective even for the very high inflation pressures of aircraft tires, which are greater than 9 bar and possibly attain 25 bar in certain specific applications. The tires have exhibited an ability to resist four times the use pressure as required by standard TSO C62.

The stacks 9 of circumferentially oriented cables are distributed into three groups, two stacks 11 arranged axially externally to the carcass reinforcement 5 on the outside of the tire, two stacks 13 arranged axially internally relative to the carcass reinforcement 5, on the inside of the tire and four stacks 12 arranged between the two circumferential alignments 6 and 7 of the carcass reinforcement 5.

The invention may also provide for cones of rubber mixes to be placed axially between the carcass reinforcement and the stacks 9 of circumferentially oriented cables to permit placement of the circumferentially oriented cables such that the axial distance between them and the carcass reinforcement increases in the radial direction. This variant embodiment is not illustrated in the figures. Such placement of the cables has been described in French application FR 0209355.

In the case of the tire described, considering the number of turns arranged internally and externally relative to the carcass reinforcement, then:

$$\Sigma R_I / \Sigma R_E \approx 1.24.$$

This has the advantage of homogenizing the mechanical stress applied on the circumferentially oriented cables in the bead.

It may also be noted that the number of turns of the stacks decreases gradually with distance relative to the axis of rotation A of the tire 1. The result is a substantially conical form of the arrangement of the circumferentially oriented cables. This has the advantage of greatly stabilizing the beads 4 upon inflation of the tire and upon passage into the contact area during operation.

All the turns of the stacks 9 are embedded in the rubber mix 10 of a modulus of extension at 10% deformation of between 10 and 20 MPa to ensure good taking-up of the forces due to the inflation pressure and hence excellent anchoring of the carcass reinforcement in the beads 4.

Figure 2:
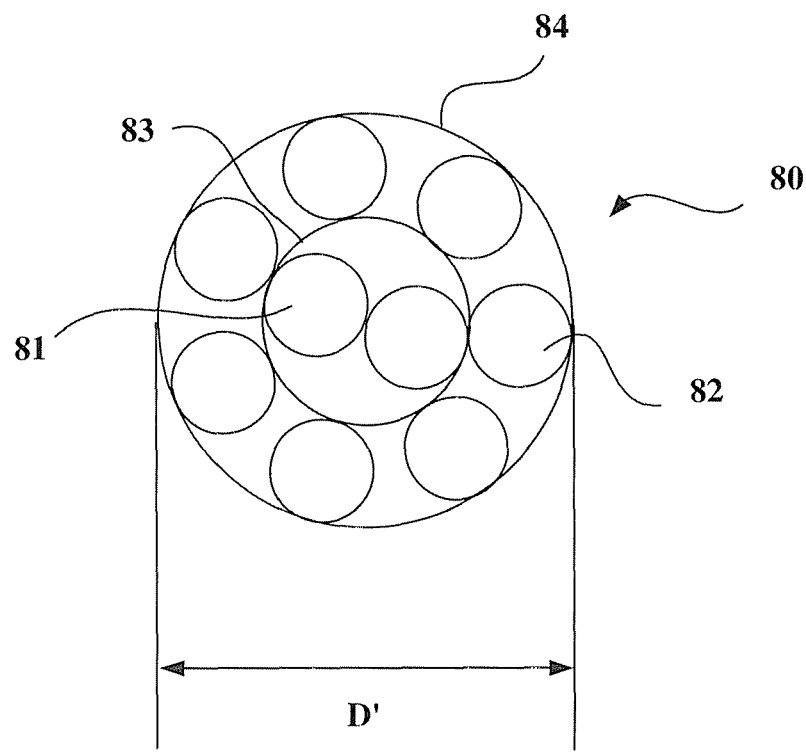

FIG. 2 shows a cable 80 used, according to the invention, in a circumferential winding as anchoring means for the reinforcement elements of the carcass reinforcement. The cable 80 is a layered cable of formula 9.35, that is to say formed of 9 elementary wires of a diameter of 35/100 mm; the cable 80 satisfies the formula 2+7 with two wires 81, constituting the first layer, twisted together to form a plied yarn, and seven wires 82, forming the outer layer, wound together in a helix around the first layer. FIG. 2 illustrates this winding by showing the seven wires 82 in contact with the circle 83 representing the space occupied by the plied yarn formed of the two wires 81 of the first layer. The wires 81, 82 are made of steel having a carbon content of between 0.7 and 0.9%. The wires have been treated beforehand so as to comprise a brass coating which promotes adhesion of the wire to the rubber. The wires have a work-hardening ratio of less than 3.5. The cable has a total diameter D', corresponding the diameter of the circle 84 circumscribed on the outer layer, of 1.35 mm. The measurement of the penetrability of this cable effected according to the method described previously resulted in a value of 100%. The breaking load of the cable is equal to 198 daN and its elongation at break is 5.4%. The elongation at break is obtained after a heat treatment such as the one mentioned above; the heat treatment makes it possible to increase the elastic and plastic elongations which are added to the structural elongation. The latter is equal to 0.1% for the cable 80 of formula 9.35.

Another layered cable, of formula 13.35, was tested; this cable is formed of 13 elementary wires of a diameter of 35/100 mm and of formula 4+9, with 4 wires, constituting the first layer, twisted together to form a plied cable, and 9 wires, forming the outer layer, wound together in a helix around the first layer. The elementary wires are the same as in the previous case. The measurement of the penetrability of this cable effected according to the method described previously resulted in a value of 80%. The breaking load of the cable is equal to 282 daN and its elongation at break is 6.4%. It should be noted that the structural elongation of this cable of formula 13.35 is 0.2%.

Figure 3:
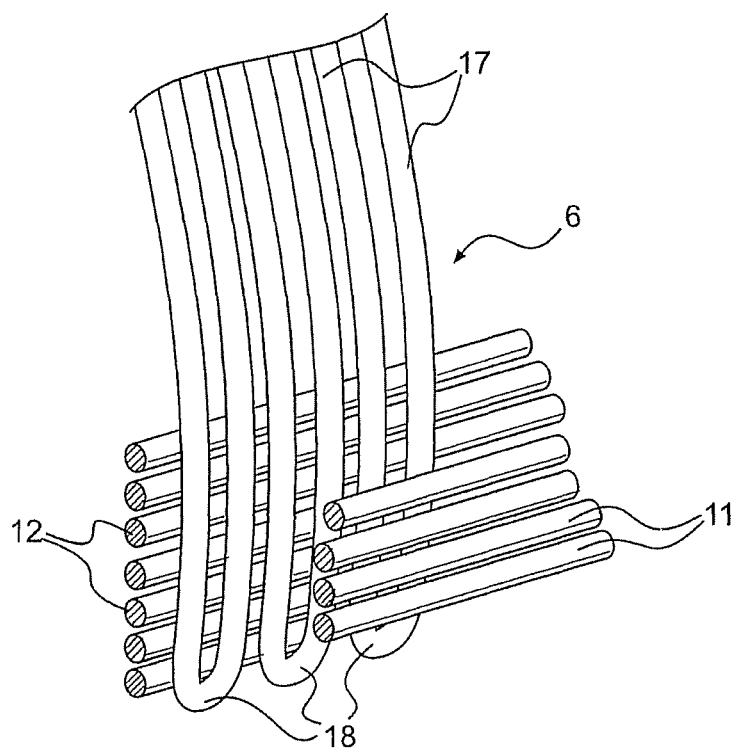

FIG. 3 is a perspective view of one of the circumferential alignments of the reinforcement elements, alignment 6, in which only the reinforcement elements are shown. In this FIG. 3, there can be seen the circumferential alignment 6 of the reinforcement elements of the carcass reinforcement which is formed of portions of reinforcement elements 17. At their radially lower ends, the portions of reinforcement elements 17 form juxtaposed loops 18, located in the bead 4. These loops 18 are adjacent and do not overlap. Axially on either side of the circumferential alignment 6 of the reinforcement elements of the carcass reinforcement, are shown only the stacks 11 and 12, of circumferentially oriented reinforcement elements, directly adjacent to this alignment 6. For clarity of the drawing, only the circumferential alignment 6 of reinforcement elements and two stacks have been shown, but the circumferential alignment 7 of reinforcement elements of the carcass reinforcement has the same arrangement of the portions of reinforcing threads 17.

Figure 4:
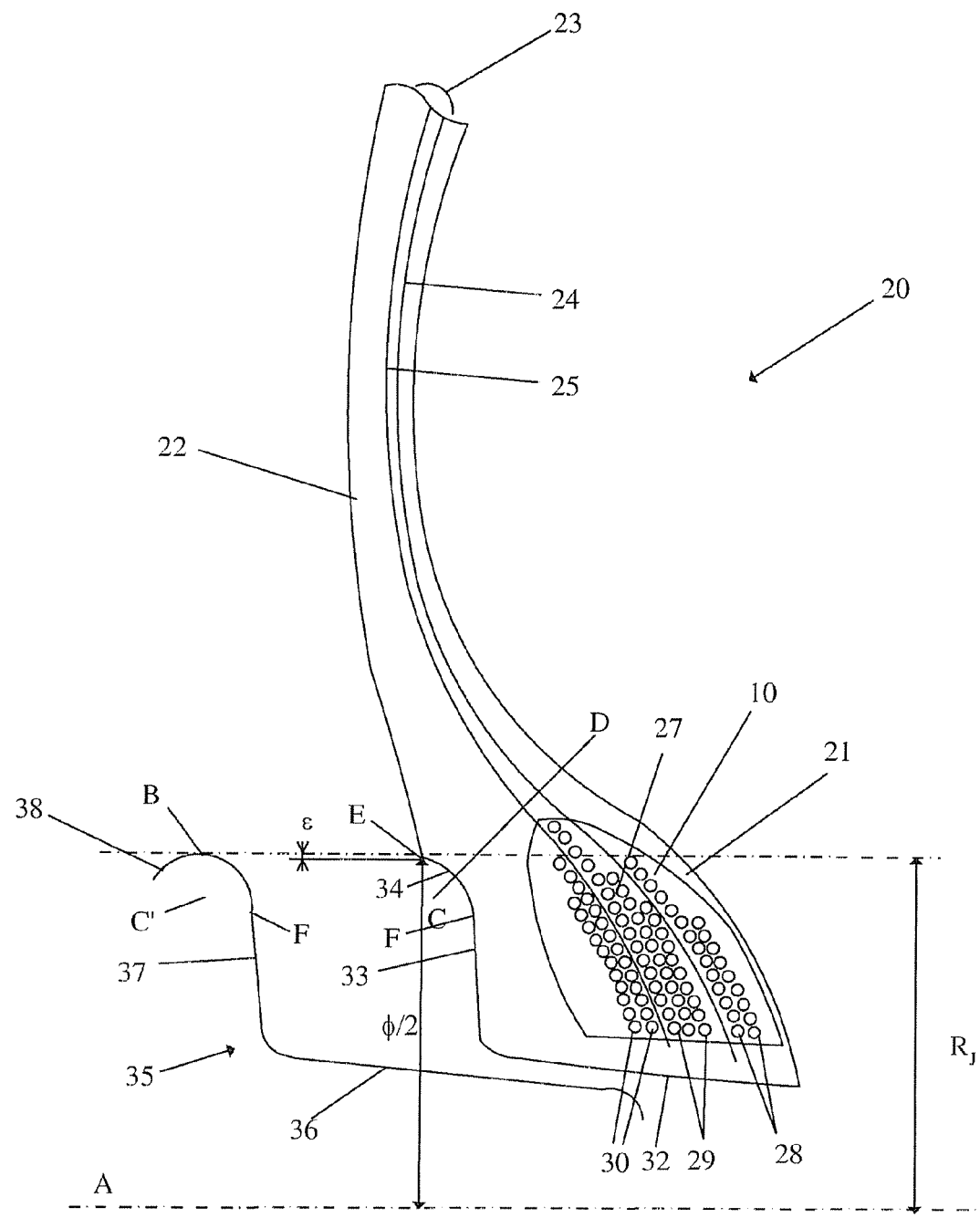

FIG. 4 illustrates a bead 21 and a sidewall 22 of a second embodiment of a tire 20 according to the invention in which the carcass reinforcement 23 is formed of two circumferential alignments 24, 25 of reinforcement elements of aromatic polyamide or aramid. In the bead 21 there are arranged stacks 27 of cables of circumferential orientation. These stacks 27 are here separated into three groups. There are found successively axially from the inner side of the bead towards the outer side, two stacks 28 arranged internally relative to the circumferential alignment of reinforcement elements of the carcass reinforcement 24, three stacks 29 arranged between the circumferential alignments of reinforcement elements of the carcass reinforcement 24 and 25, and two stacks 30 arranged externally relative to the circumferential alignment of reinforcement elements of the carcass reinforcement 25.

As previously, the number of turns of circumferentially oriented cables is such that it is ensured that the total of the rigidities of extension of the stacks arranged externally relative to the carcass reinforcement is substantially of the same order as the total of the rigidities of extension of the stacks arranged internally relative to the carcass reinforcement 23.

The outer surface of the bead 21 comprises a seat 32, a frustoconical wall of substantially radial orientation 33 adjacent radially internally to a wall 34 the section of which is an arc of a circle EF of centre C. C is located to the outside of the bead 21. Considering the line CD which passes through the bead, forming an angle $\alpha=+45\pm5$ degrees relative to the axis of rotation A of the tire (this angle is determined when the tire is mounted on its rim), it will be noted that all the circumferentially oriented reinforcement elements 27 are arranged at a radial distance from the axis A less than or equal to this line CD. This line CD defines substantially a very rigid embedding zone, in which the deformations are very much reduced, and a zone of flexure radially above CD. The fact that all the circumferentially oriented reinforcement elements are in the embedding zone reinforces the endurance of the bead.

This outer surface of the bead is intended to come to bear against the wall of a rim 35 whose outer profile is also shown in FIG. 4. This profile comprises the seat 36 and the substantially radial wall of the hook 37 followed by the flange 38. The flange 38 has a cross-section in the shape of an arc of a circle of centre C'. The highest point of diameter is B, of radius $R_f$. The point E arranged on the axially outer surface of the bead 21 is intended to come into contact with substantially the point B. When the tire is mounted on the rim 35, the surfaces 34 and 38 are homocentric, that is to say that their centers C and C' are the same. The point E is located on a circumference of diameter Φ. We have the relationship:

$$\Phi=2(R_f-\epsilon)$$

where $\epsilon$ between 0.5 and 2 mm.

This slight offset of the point E between its free position and its position mounted on the rim, in contact with B, enables the bead to be slightly extended when it is mounted on the rim and promotes the quality of the contact obtained. This contact as far as point E reinforces the stability of the bead during the pressurization of the tire and during passage into the contact area during operation. Consequently, it will be noted that the circumferential alignments of the carcass reinforcement are substantially less stressed in compression upon passage into the contact area, contrary to what happens for aircraft tires of conventional structure.

FIG. 1 also shows a first example of a crown reinforcement 14. This is formed of a working block comprising two layers of reinforcement elements 15 and 16 of substantially circumferential orientation obtained by helical winding of at least one reinforcement element. The number of layers of reinforcing thread and the laying pitch are adapted according to the dimension of the tire and its conditions of use. This embodiment of a crown reinforcement has the advantage of providing very effective wrapping which minimizes the variation in the dimensions of the tire upon inflation and at high speed. It will be noted that the change in the profile may be three to four times less than for a conventional aircraft tire such as a 30×8.8 R15 AIRX. This excellent wrapping also has the advantage of not greatly extending the mixes forming the tread of the crown of the tire. The surface cracking of the tread due to the ozone present in the air is greatly reduced.

Figure 5:
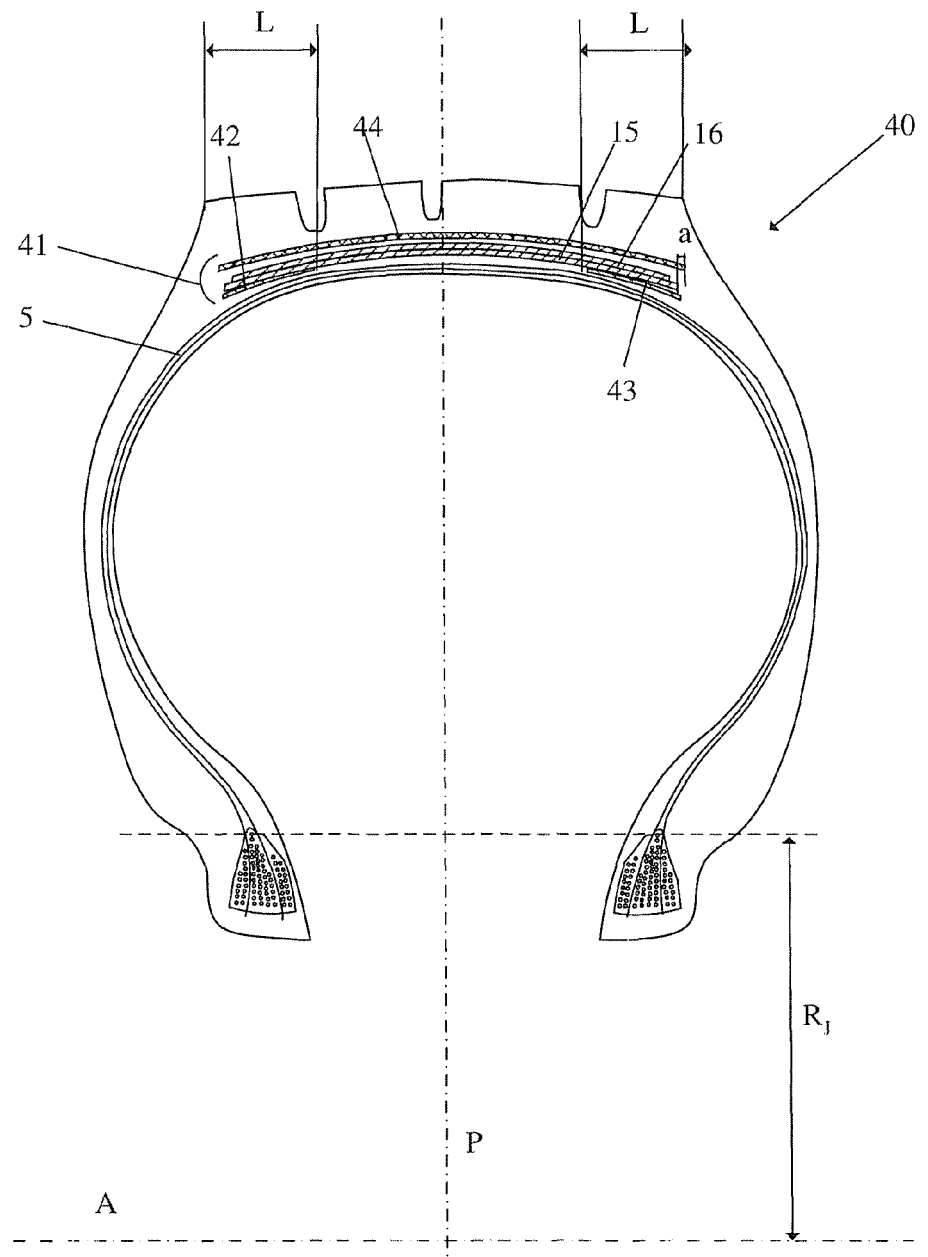

The crown reinforcement 41 of the tire 40 shown in FIG. 5 comprises, as previously, two layers of reinforcement elements of substantially circumferential orientation 15 and 16, and is finished off by two layers 42 and 43 of substantially circumferentially oriented reinforcement elements, arranged axially on either side of the median plane of the tire in the lateral zones of the crown. They make it possible to reinforce the wrapping of the lateral zones L of the crown. The layers 42 and 43 are arranged radially between the layers 15 and 16 and the carcass reinforcement 5.

The reinforcement 41 is also finished off by a protective crown layer 44 arranged radially externally relative to the other layers of the crown reinforcement 41. This protective crown layer may be formed of metallic reinforcement elements which undulate so that they are not stressed in normal operation. It should be noted that this protective layer extends axially beyond the layers 15 and 16 on either side of the median plane P of the tire by an axial distance a.

Figure 6:
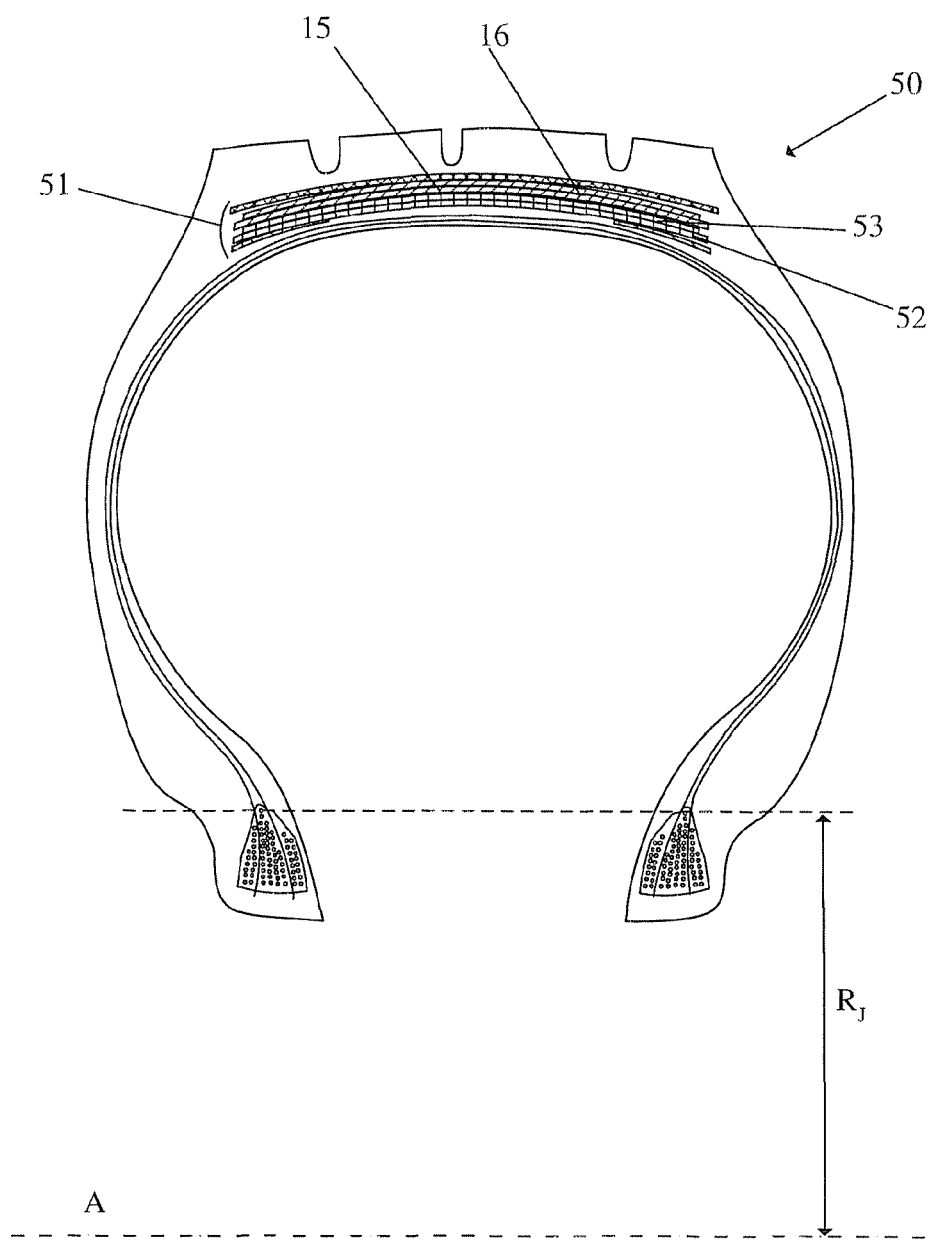

FIG. 6 shows a tire 50 with a crown reinforcement 51 furthermore comprising two layers 52, 53 of reinforcement elements, which are parallel to each other in each layer and crossed from one layer to the next, forming with the circumferential direction an angle α of between 5° and 35°. These two layers are arranged radially below the layers of circumferential reinforcement elements 15 and 16. They increase the drift thrust of the tire 30 relative to that of the tire 40.

Figure 7A:
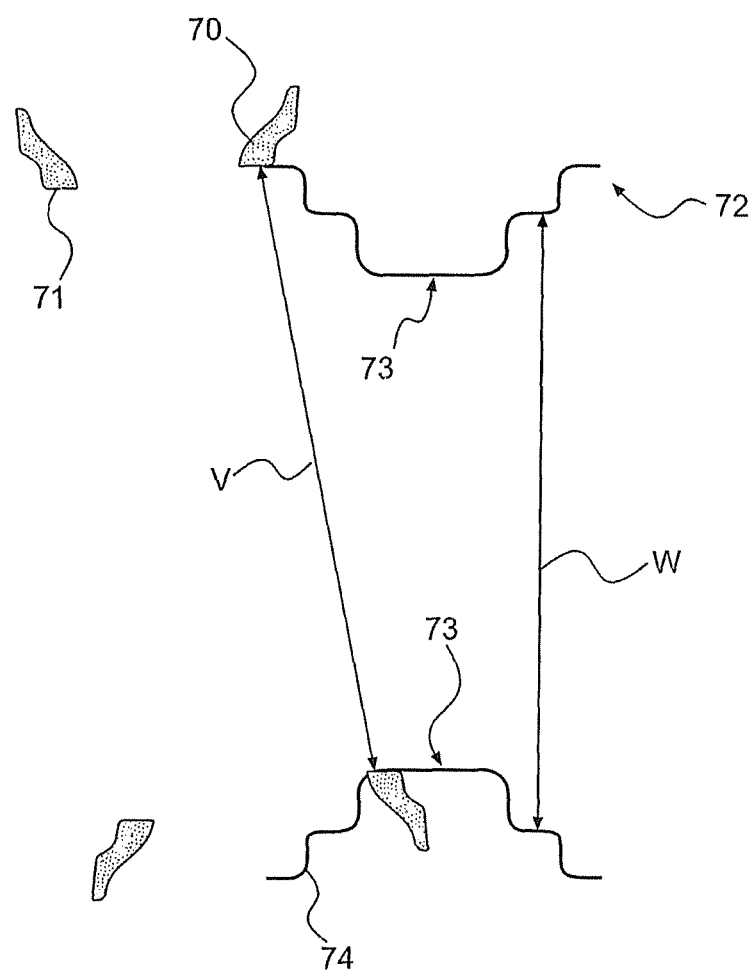
Figure 7B:
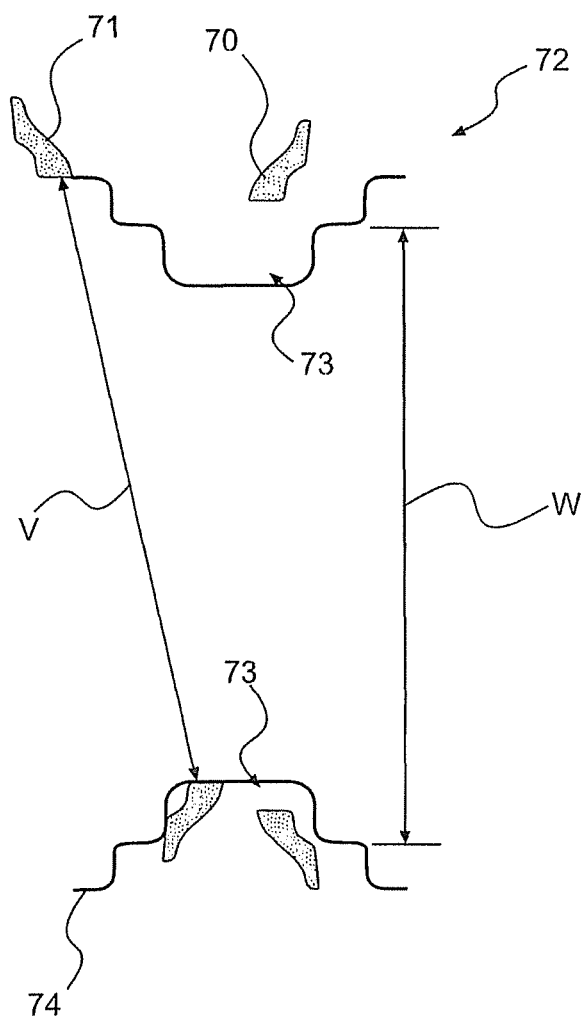
Figure 7C:
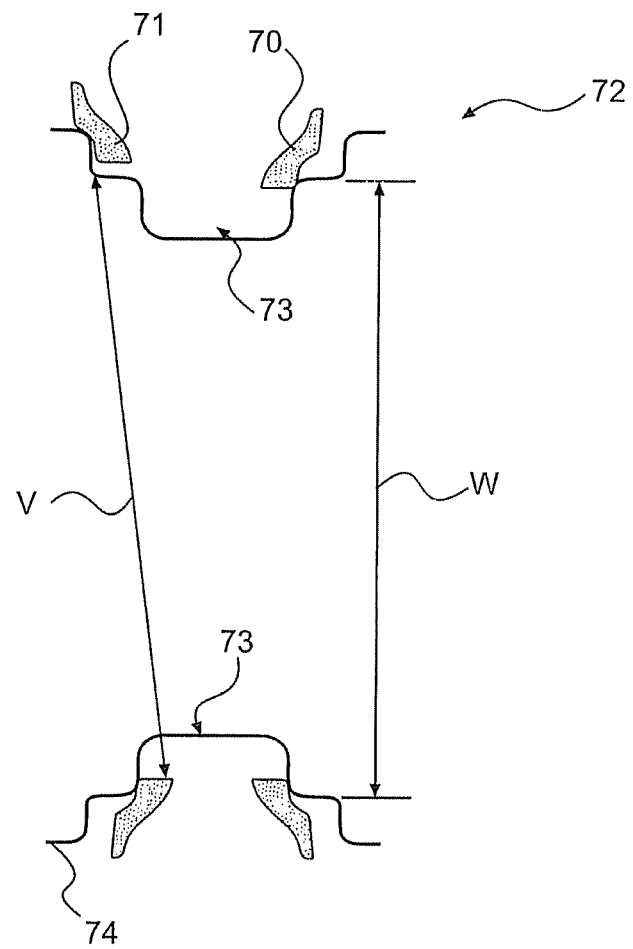

FIGS. 7a, 7b, 7c illustrate by sectional diagrams the stages of mounting a tire according to the invention on a wheel 72 of monobloc type comprising a drop-centre functionality represented by the indentations 73. The figures show diagrammatically only the beads 70, 71 of the tire according to the invention.

In FIG. 7a, it will be observed that part of the first bead 70 is passed over the rim flange 74 and is placed in the indented zone or drop centre 73. It is then possible to pass the rest of the bead 70 over the flange 74 by slightly ovalising the corresponding bead of the tire. The deformation of the bead 70 necessary to carry out this step must make it possible to obtain a diametrically opposed edge-to-edge distance of the bead 70 equivalent to the length V. This deformation of the bead is furthermore accompanied by warping of the bead 70 making it possible gradually to pass the bead 70 over the rim flange 74. The diameter of the bead 70 corresponds substantially to the diameter W of the rim seat which is to receive the bead.

FIG. 7b shows that the same applies for passing the second bead 71 over the flange 74 of the rim 72. Part of the first bead 71 is passed over the rim flange 74 and is placed in the indented zone or drop centre 73. As previously for the bead 70, it is then possible to pass the rest of the bead 71 over the flange 74 by slightly ovalising the corresponding bead of the tire, accompanied by warping thereof.

FIG. 7c illustrates the end of mounting by a step of inflation to a pressure such as will ensure that the beads 70, 71 are placed properly on the seats 75, 76 bearing on the rim flanges.

Experiments relating to the anchoring rubber mix have shown that in order to obtain good endurance results, an anchoring rubber mix containing an "SBR" synthetic elastomer, or butadiene/styrene copolymer, of a Tg of between −70° and −30° C., used alone or in a blend with "BR", or polybutadiene, can be used. Preferably, the BR has a Tg of between −110° and −90° C. The synthetic elastomer(s) is/are used in a total proportion of at least 50% of the total weight of elastomer, the balance being formed by natural rubber ("NR"). The anchoring rubber mix additionally contains reinforcing fillers such as carbon black and a vulcanization system appropriate for obtaining the desired rigidity. The circumferential reinforcement elements, in the examples shown, are brass-coated metal cables. It is therefore necessary for the anchoring rubber mix to have a high sulphur content and to contain additives promoting adhesion to the brass (for example cobalt or nickel metal salts). For example, an amount of sulphur of between 5 and 8% of the total weight of elastomer and an amount of carbon black of between 60 and 70% of the total weight of elastomer are used. Carbon black N347 may be preferably used.

Four mixes were produced and tested to illustrate the characteristics of the anchoring rubber mixes according to the invention.

The main characteristics of the formulation of these mixes are found in the table below.

| Products | 1 | 2 | 3 | 4 |
|---|---|---|---|---|
| NR | 100 | 80 | 40 | 40 |
| SBR2300 | 0 | 10 | 30 | 60 |
| BR113 | 0 | 10 | 30 | 0 |
| N347 | 62 | 62 | 62 | 62 |
| Sulphur | 7 | 7 | 7 | 7 |

These four mixes were tested thus:
rigidity: determination of the elasticity modulus at 10% extension and ambient temperature,
creep: static creep test at 150° C. for 5 hours as described previously, and
thermal stability: rheometry test at 197° C. for 10 min as described previously.

| Test | 1 | 2 | 3 | 4 |
|---|---|---|---|---|
| Elasticity modulus | 10.6 | 11.8 | 11.6 | 13.0 |
| Creep test | Break after 30 min | Break after 60 min | OK | OK |
| τ | — | — | $1 \times 10^{-3}$/min | $0.6 \times 10^{-3}$/min |
| r | 35% | 26% | 1.5% | 7.7% |

The four mixes have satisfactory rigidity.

The mix 1, based solely on natural rubber, has a static creep resistance at high temperature which is completely inadequate. Breaking of the test pieces was observed after 30 minutes' testing. Its thermal stability is also not satisfactory, since the mix has a very marked amount of reversion.

Mix 2 has improved results compared with the first, but is not satisfactory either.

Mixes 3 and 4 successfully pass the static creep and rheometry tests. Their creep resistance is entirely correct, and their thermal stability at high temperature is, too. Mix 3, which comprises three elastomers, has a slightly more satisfactory reversion result than mix 4.

Tire tests were also carried out with anchoring rubber mixes of formulations similar to the mixes 1 to 4 of the test.

A tire of dimension 30×8.8 R15/16/225 was tested which comprised:
as carcass reinforcement two circumferential alignments of reinforcement elements;
as circumferentially oriented cables steel cables such as those described in FIG. 2, of formula 9.35, and distributed in 7 stacks 27 (as illustrated in FIG. 4):
2 axially innermost stacks with 12 and 15 turns,
3 stacks between the circumferential alignments 24 and 25 with 17, 14 and 16 turns,
2 axially outermost stacks with 11 and 7 turns.

a crown reinforcement with two layers of reinforcement elements oriented substantially circumferentially formed of plied cables.

The tires exhibited a correct aptitude for the mounting and demounting operations, but only those comprising an anchoring rubber mix corresponding to the formulations of mixes 3 and 4 exhibited sufficient endurance of the anchoring of the carcass ply in the beads.

Furthermore, the tires corresponding to mixes 3 and 4 underwent bursting-resistance tests and the maximum pressures measured were of the order of 58 bar. They are also characterized by an amount of elongation of their development between zero pressure and their operating pressure of 15 bar of the order of 1.5%. These tires also successfully underwent takeoff tests similar to the standardized tests for certification of aircraft tires.

The building of such a tire according to the invention may advantageously be effected on a rigid core which imposes the form of its inner cavity, such as those described by EP 242 840 or EP 822 047, which are incorporated in the present application by reference. There are applied to this core, in the order required by the final architecture, all the constituents of the tire, which are arranged directly in their final position, without undergoing shaping at any moment of the building operation. The curing takes place on the core, the latter being removed only after the vulcanization phase has finished.

This method of manufacture has the advantage of greatly reducing, or even eliminating, the pre-stresses imposed on the reinforcing threads, particularly those oriented at 0°, during the traditional shaping phases.

The casing may also be partially cooled on the core in order to keep the reinforcement elements in the state of deformation imposed during laying.

Equivalently, it is also possible to manufacture the tire on a drum such as described in WO 97/47 463 or EP 0 718 090, provided that the blank of the tire is shaped before laying the circumferentially oriented cables.

The circumferentially oriented cables may also be laid on a form having a geometry identical to the form intended in the curing mould. The crown block is then assembled with the complementary blank of the tire using transfer techniques known to the person skilled in the art, then, still using known principles, the tire is fitted and pressurized by deploying a membrane inside the tire.

This embodiment also guarantees the absence of pre-stresses due to the shaping in the vulcanization press.

Whatever the manufacturing method selected for producing a tire according to the invention in which the anchoring means for the reinforcement elements of the carcass reinforcement within each bead are circumferentially oriented cables axially bordering the circumferential alignments of said reinforcement elements of the carcass reinforcement, it would appear that the combination of the cables laid in a circumferential orientation and the anchoring rubber mix according to the invention makes it possible to produce tires which may be mounted on rims of wheels of monobloc type.

Furthermore, the selection of the cables laid in a circumferential orientation in the zone of the bead to anchor the reinforcement elements of the carcass reinforcement makes it possible to obtain satisfactory manufacturing yields, because the selection of these cables permits hooking during their laying in the uncured state which is sufficient for them not to risk becoming detached or simply displaced before the curing phase.

The description of the figures has been limited to the case of tires in which the anchoring means for the reinforcement elements of the carcass reinforcement within each bead are circumferentially oriented cables axially bordering the circumferential alignments of said reinforcement elements of the carcass reinforcement but, as previously mentioned, it is also directed at tires in which the carcass reinforcement comprises at least one layer of reinforcement elements having a zone of upturn around at least one circumferentially oriented reinforcement element such as a bead wire.

The invention must also not be understood as being limited to the case of mounted assemblies formed in particular of a wheel of monobloc type comprising a drop-centre functionality; as explained previously, the invention is also directed at mounted assemblies formed of a tire according to the invention and a conventional wheel for aircraft applications which is formed of several parts.

The invention claimed is:

1. A mounted assembly for aircraft formed of:
a wheel comprising:
    a monobloc-type rim for receiving a tire;
    seats for receiving beads of said tire, and
    a drop-centre functionality,
a tire having an inflation pressure of greater than 9 bar and a relative deflection greater than 30%, comprising:
a crown,
two sidewalls and two beads,
a carcass reinforcement anchored in the two beads, comprising:
    at least one circumferential alignment of carcass reinforcement elements anchored within each bead by, and axially bordering, at least one circumferentially oriented reinforcement element comprising at least one circumferentially oriented cable having a penetrability of between 80% and 100%, and
    at least one anchoring rubber mix in contact with the at least one circumferentially oriented reinforcement element and the carcass reinforcement elements of the circumferential alignment, said anchoring rubber mix having an elasticity modulus at a deformation of 10% of less than 20 MPa; and
a crown reinforcement.

2. The mounted assembly for aircraft according to claim 1, wherein the seats of the rim have a slope greater than 5°.

3. The mounted assembly for aircraft according to claim 2, wherein the seats of the rim have a slope less than 15°.

4. The mounted assembly for aircraft according to claim 1, wherein the beads of the tire may be warped.

5. The mounted assembly for aircraft according to claim 1, wherein the carcass reinforcement comprises elements arranged in a radial orientation.

6. The mounted assembly for aircraft according to claim 1, wherein the beads of the tire can be warped.

7. The mounted assembly for aircraft according to claim 1, wherein the anchoring rubber mix comprises at least one synthetic elastomer included in the group of styrene-butadiene copolymer (SBRs) and polybutadiene (BRs) with a total proportion of synthetic elastomer greater than 50% of the total weight of elastomers.

8. The mounted assembly for aircraft according to claim 1, wherein the anchoring rubber mix comprises a styrene-butadiene copolymer (SBR) having a Tg of between −70° and −25° C. in a proportion by weight greater than 20% of the total weight of elastomers.

9. The mounted assembly for aircraft according to claim 1, wherein the anchoring rubber mix comprises a butadiene rubber (BR) having a Tg of between −110° and −90° C. in a proportion by weight less than 40% of the total weight of elastomers.

10. The mounted assembly for aircraft according to claim 1, wherein the anchoring rubber mix withstands without breaking a static creep stress at 150° C. under an initial stress of 2.35 MPa for at least five hours.

11. The mounted assembly for aircraft according to claim 10, wherein the anchoring rubber mix has an amount of static creep at 150° C. under an initial stress of 2.35 MPa of less than $2 \times 10^{-3}$ mn$^{-1}$ for between three and five hours.

12. The mounted assembly for aircraft according to claim 1, wherein the anchoring rubber mix has an amount of reversion after 10 min at 197° C. of less than 10%.

13. The mounted assembly for aircraft according to claim 1, wherein the breaking load of the circumferentially oriented cables is greater than 150 daN and wherein said circumferentially oriented cables have an elongation at break greater than 4%.

14. The mounted assembly for aircraft according to claim 13, wherein the breaking load of the circumferentially oriented cables is less than 400 daN.

15. The mounted assembly for aircraft according to claim 13, wherein the elongation at break of the circumferentially oriented cables is less than 8%.

16. The mounted assembly for aircraft according to claim 1, wherein said circumferentially oriented cables are formed of cords selected from the group consisting of carbon, tungsten, aramid, glass-fiber or steel reinforcing threads.

17. The mounted assembly for aircraft according to claim 1, the circumferentially oriented cables are heat-treated metal cables.

18. The mounted assembly for aircraft according to claim 1, wherein the circumferentially oriented cables comprises a surface having an adherent coating.

19. The mounted assembly for aircraft according to claim 18, wherein the adherent coating is a brass coating.

20. The mounted assembly for aircraft according to claim 1, wherein, considering $\Sigma R_I$ as being the total of the rigidities of extension of each circumferentially oriented cable arranged axially internally relative to the carcass reinforcement, and considering $\Sigma R_E$ as being the total of the rigidities of extension of each circumferentially oriented cable arranged axially outside of the carcass reinforcement:

$$0.6 \leq \frac{\sum R_I}{\sum R_E} \leq 1.5.$$

21. The mounted assembly for aircraft according to claim 20, in which:

$$0.7 \leq \frac{\sum R_I}{\sum R_E} \leq 1.3.$$

22. The mounted assembly for aircraft according to claim 1, wherein the beads have an outer surface comprising a seat, a frustoconical wall of substantially radial orientation adjacent radially internally to a wall the section of which is an arc of a circle EF of centre C, and considering a line CD passing through the bead, forming an angle α=+45±5 degrees relative to the axis A of the tire, wherein the circumferentially oriented cable is arranged at a radial distance from the axis A less than or equal to said line CD.

23. The mounted assembly for aircraft according to claim 1, wherein the bead has an outer surface intended to come into contact with the corresponding surface of the seat and of a hook of said rim, after mounting on said rim and inflation of said tire, wherein said outer surface of said bead and said rim are in contact in a contact zone that extends at least as far as a point of the hook having a maximum radius $R_J$.

24. The mounted assembly for aircraft according to claim 23, wherein, $\Phi$ is the diameter of a circumference of the outer surface of the bead intended to come into contact with a circumference of the hook of the rim of maximum radius $R_J$, such that:

$$\Phi = 2(R_J - \epsilon)$$

wherein $\epsilon$ is between 0.5 and 2 mm.

25. The mounted assembly for aircraft according to claim 1, in which said carcass reinforcement elements form forward and return paths arranged adjacently, with, at the level of each bead, loops connecting one forward path to one return path each time.

26. The mounted assembly for aircraft according to claim 1, wherein said crown reinforcement comprises at least one working block with at least two layers of reinforcing threads which are parallel in each layer, oriented substantially circumferentially and of high elasticity modulus.

27. The mounted assembly for aircraft according to claim 26, wherein said crown comprises a central zone and two lateral zones, wherein said working block comprises two layers of reinforcement elements of high elasticity modulus, oriented substantially circumferentially, arranged axially on either side of the median plane of the tire in the lateral zones of said crown.

28. The mounted assembly for aircraft according to claim 27, wherein said two layers of reinforcement elements of high elasticity modulus of said working block are arranged radially to the inside of said two layers of circumferentially oriented reinforcing threads of said working block.

29. The mounted assembly for aircraft according to claim 26, wherein said working block further comprises two layers of reinforcing threads, which are parallel to each other in each layer and crossed from one layer to the next, forming an angle $\alpha$ of between 5° and 35°, with the circumferential direction, said reinforcing threads having a high elasticity modulus.

30. The mounted assembly for aircraft according to claim 26, wherein said crown reinforcement further comprises, arranged radially externally relative to said working block, a protective layer extending axially beyond the axial width of said layer or layers of reinforcing threads of high elasticity modulus.

31. An aircraft tire having an inflation pressure greater than 9 bar and a relative deflection greater than 30%, comprising:
  a crown,
  two sidewalls and two beads,
  a carcass reinforcement anchored in the two beads comprising:
    at least one circumferential alignment of reinforcement elements
    an anchor for said reinforcement elements within each bead comprising at least one circumferentially oriented reinforcement element comprising at least one circumferentially oriented cable having a penetrability of between 80% and 100%, and axially bordering the at least one circumferential alignment of carcass reinforcement elements, and
    at least one anchoring rubber mix in contact with a circumferential reinforcing thread and the at least one circumferentially oriented reinforcement element of the carcass reinforcement, said anchoring rubber mix having an elasticity modulus at a deformation of 10% of less than 20 MPa, and
  a crown reinforcement.

* * * * *